(12) United States Patent
Le et al.

(10) Patent No.: US 6,552,875 B1
(45) Date of Patent: Apr. 22, 2003

(54) SUSPENSION DESIGN FOR IMPROVING THE CURING PROCESS FOR HEAD BONDING APPLICATION AND METHOD FOR SAME

(75) Inventors: Hienminh Huu Le, San Jose, CA (US); Tzong-Shii Pan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/620,791

(22) Filed: Jul. 21, 2000

(51) Int. Cl.[7] .................................................. G11B 5/60
(52) U.S. Cl. ...................................................... 360/234.6
(58) Field of Search ............................. 360/234.6, 245, 360/245.3, 245.4

(56) References Cited

U.S. PATENT DOCUMENTS

| | | |
|---|---|---|
| 5,598,307 A | 1/1997 | Bennin |
| 5,612,840 A | 3/1997 | Hiraoka et al. |
| 5,901,014 A | 5/1999 | Hiraoka et al. |
| 5,943,190 A | 8/1999 | Fanslau, Jr. |
| 5,973,884 A * | 10/1999 | Hagen ..................... 360/245.3 |

\* cited by examiner

*Primary Examiner*—Robert S. Tupper
(74) *Attorney, Agent, or Firm*—Altera Law Group, LLC

(57) ABSTRACT

A suspension design for improving the curing process for head bonding application and a method for same is disclosed. Vias are formed in the load beam and the flexure so that UV light is allowed to pass to cure the UV sensitive adhesive thereby bonding the slider to the head gimbal assembly.

16 Claims, 7 Drawing Sheets

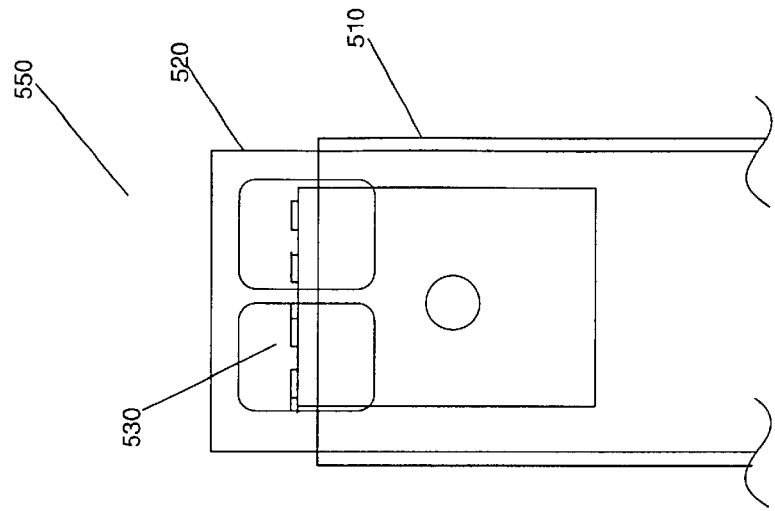
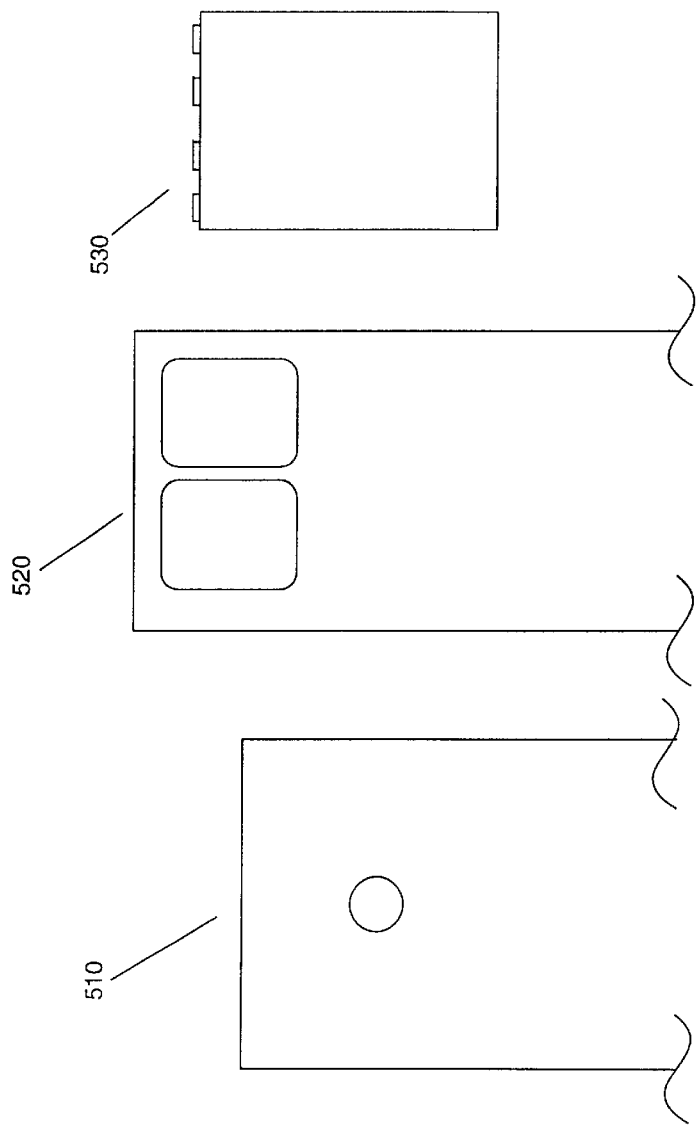
Fig. 5a  Fig. 5b  Fig. 5c  Fig. 5d

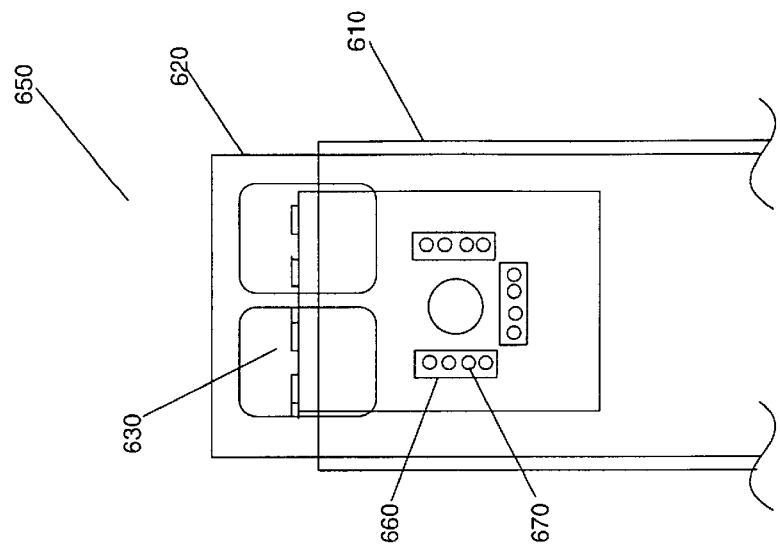
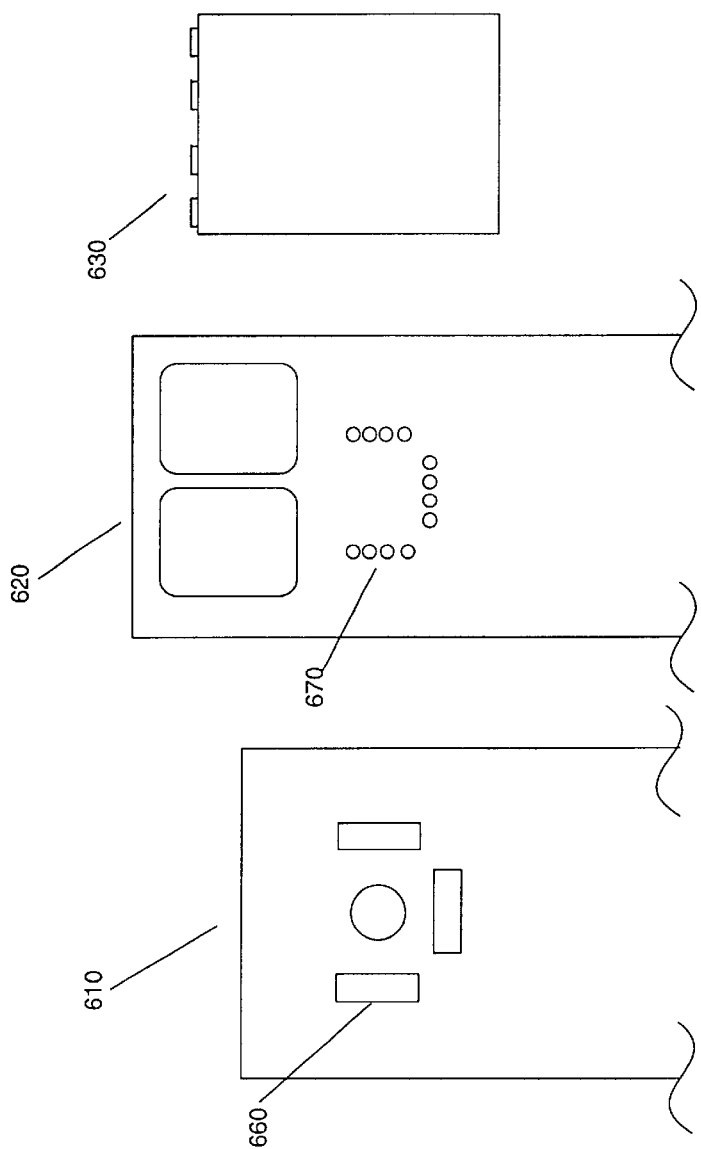
Fig. 6d
Fig. 6c
Fig. 6b
Fig. 6a

SUSPENSION DESIGN FOR IMPROVING THE CURING PROCESS FOR HEAD BONDING APPLICATION AND METHOD FOR SAME

BACKGROUND OF THE INVENTION

1. Field of the Invention

This invention relates in general to a direct address storage device (DASD), and more particularly to a suspension design for improving the curing process for head bonding application and method for same.

2. Description of Related Art

Direct access storage devices (DASD), or disk drives, store information on concentric tracks of a rotatable magnetic recording disk. A magnetic head or transducer element is moved from track to track to read and record the desired information. Typically, the magnetic head is positioned on an air bearing slider which flies above the surface of the disk as the disk rotates. In some recently proposed disk drives, the slider (or carrier) rides on a liquid film or bearing on the disk.

In such disk drives, it has been customary to start and stop the operation by a contact start/stop (CSS) process. One design objective of conventional magnetic disk drives is to cause most of the wear to occur at the slider/disk interface during the start and stop stages. Minimal wear during the start and stop stages is crucial but is often difficult to achieve.

A prerequisite to the CSS process is that the surface of the magnetic disk be roughened to a degree sufficient to prevent high stiction that causes the air bearing slider and the disk to adhere while the disk is not in operation. Moreover, in order to meet the demand for increased areal density, efforts have been made to minimize the head flying height, which requires smoother disks.

In light of these design objectives attempts have been made to decrease the slider size and to design new loading/unloading mechanisms for avoiding contact start/stop. Conventionally, a constant gram load is provided to the head suspension for loading the magnetic head to the disk. The gram load acts to counterbalance the effect of the air bearing lift force.

A head suspension assembly (HSA) connects the slider to a rotary or linear actuator. The suspension provides support for the slider and allows the slider to gimbal in order to adjust its orientation as appropriate. The head suspension assembly typically comprises a load beam attached to an gimbal (or the gimbal is a unitary part of the load beam), a flexible member (known as a flexure) attached to the load beam, and a slider attached to the flexure.

The slider includes a self-acting hydrodynamic air bearing and an electromagnetic transducer for recording and retrieving information on a rotating magnetic disk. The slider is attached to the gimbal and the gimbal is compliant in the slider's pitch and roll axes in order that the slider follows the topology of the disk surface, but is rigid in the yaw and in-plane axes for maintaining precise slider positioning. The load beam is attached to or is made as an integral part of the gimbal, and the load beam is attached to or includes a mounting arm which attaches the entire HSA to an actuator of a disk drive actuator drive assembly. The gimbal also usually includes a portion for the support of electrical traces connected to the transducer and extending along the length of the load beam to its mounted end.

In a magnetic disk drive, the slider supports a read and write transducer. A write transducer transforms electrical pulses to small magnetic fields which it then "writes" on a magnetic disk. A read transducer decodes these magnetic fields back into electrical pulses. The order of the magnetic fields and their subsequent orientation, aligned along the circumference of the disk in a diametrical configuration, defines a bit code that the transducer detects as the head floats on a cushion of air over the magnetic disk. As indicated, the head assembly includes electrical terminals, via traces, to send and receive these electrical pulses.

A HSA generally attaches at its proximal end to a rigid arm manipulated by a linear or rotary motion actuator designed to position the head at any radial location above the disk. The spinning disk coupled with the actuator movement allows the head to gain access to multiple tracks across the disk surface, each track capable of containing large amounts of densely stored data.

Positioned at the distal end of the suspension assembly, a gimbal holds the head assembly level and at a constant distance over the contours of the disk. This gimbal is the most critical of the spring regions in a HSA. The closer the head assembly can fly to the surface of a magnetic disk, the more densely can information be stored (the strength of a magnetic field is proportional to the square of the distance, thus the closer the head flies, the smaller the magnetic "spot" of information). Today's disk drives strive to reach flying clearances close to 20 nanometers or lower, i.e., 0.02 micrometers whereas a human hair is about 100 micrometers thick. Greater data densities allow for greater storage and smaller size. But the head assembly must not touch the disk ("crash"), as the impact with the rapidly spinning disk (rotating at about 3600 rpm or faster) could destroy both the head and the surface of the disk, along with the data stored on it.

In order to achieve this delicate and precise positioning, a suspension assembly, and specially the gimbal flexure, must carefully balance the load applied to the head assembly against the upward lift of the air stream on the slider. Since at this microscopic level, the seemingly smooth surface of the disk is full of peaks and valleys, the gimbal spring must be very responsive in order to maintain a level flying height. To avoid delays and errors, it must also resist torsion and momentum forces, and maintain the head parallel to the surface even after rapid repositioning movements. The best suspension assemblies are low in mass, to reduce momentum on the floating head, and very flexible along the Z-axis, perpendicular to the medium surface, to quickly adjust to surface undulations. They also are balanced carefully to reduce static roll and pitch to acceptable levels and to avoid applying an initial twist to the head.

In the conventional disk drive, the slider is mounted to the free end of the gimbal assembly. The slider must be mounted to the flexure so that the head assembly is in a predetermined (e.g., planar and parallel) relationship to the disk surface to assure accuracy and overall planarity. As the head writes to and reads from the disk, it receives and sends electrical pulses of encoded information. Complex head assemblies may require four or more different input and output terminals. The electrical signals are relayed to appropriate amplifying and processing circuitry. Signal transmission requires conductors between the dynamic "flying" slider and the static circuitry of the data channels.

Today, a preferred method of bonding is to use an adhesive that is cured by UV (ultraviolet) light. There are many advantages to using UV cured adhesives, such as low tack-time and low crown contribution. However, UV curing of adhesives with current suspension designs present a problem because the load beam and flexure block the UV light. In order to get completely cured adhesive, the UV light needs to activate the chemical reaction in the adhesive by penetrating some certain wavelength to the adhesive. Current suspension designs make this very difficult. In such an instance, the adhesive may not become fully cured and the bond is thereby weak at best.

It can be seen that there is a need for a suspension design for improving the curing process for head bonding application and a method for same.

SUMMARY OF THE INVENTION

To overcome the limitations in the prior art described above, and to overcome other limitations that will become apparent upon reading and understanding the present specification, the present invention discloses a suspension design for improving the curing process for head bonding application and a method for same.

The present invention solves the above-described problems by providing vias in the load beam and the flexure for UV light to pass. It is very important for the UV light to be able to access the UV adhesive along the adhesive boundary such that cured adhesive can form a seal, which prevents oxygen from getting into the adhesive. Thus, it will achieve complete cure during the following thermal cure.

A method in accordance with the principles of the present invention includes forming a load beam having load beam vias formed therein at a distal end thereof, forming a flexure having flexure vias formed therein, applying a UV sensitive adhesive to a slider, positioning the slider against the flexure and directing UV light through the load beam vias and the flexure vias to cure the adhesive to securely bond the slider to the flexure.

Other embodiments of a method in accordance with the principles of the invention may include alternative or optional additional aspects. One such aspect of the present invention is that the method further includes selecting positions for the flexure vias that align with the load beam vias.

Another aspect of the present invention is that the load beam vias are formed using a laser to cut the load beam vias in the load beam.

Another aspect of the present invention is that the flexure vias are formed using a laser to cut the flexure vias in the flexure.

Another aspect of the present invention is that the load beam vias are formed by etching the load beam vias in the load beam.

Another aspect of the present invention is that the flexure vias are formed by etching the flexure vias in the flexure.

In another embodiment of the present invention, a disk drive is provided. The disk drive includes a rotating data storage medium mounted for rotation about an axis, a head gimbal assembly, the head gimbal assembly comprising a load beam, a flexure and a slider, wherein the slider includes a transducer and an actuator, coupled to the head gimbal assembly, for moving the transducer relative to the data storage medium for reading and writing data to the data storage medium, wherein the load beam has load beam vias formed therein at a distal end thereof and the flexure has flexure vias formed therein, the load beam vias and flexure vias positioned to allow UV light to pass through without blocking to cure a UV sensitive adhesive used to securely bond the slider to the flexure.

Another aspect of the present invention is that positions for the flexure vias are selected to align with the load beam vias.

Another aspect of the present invention is that the load beam vias and flexure vias are formed using a laser or by etching.

In another embodiment of the present invention, a head gimbal assembly is provided. The head gimbal assembly includes a load beam having load beam vias formed therein at a distal end thereof, a flexure coupled to the load beam, the flexure having flexure vias formed therein and a slider having a transducer for reading and writing data to data storage media, the slider having a UV sensitive adhesive applied thereto, wherein the load beam vias and flexure vias are positioned to allow UV light to pass through without blocking to cure the UV sensitive adhesive to securely bond the slider to the flexure.

Another aspect of the present invention is that positions for the flexure vias are selected to align with the load beam vias.

Another aspect of the present invention is that the load beam vias and flexure vias are formed using a laser or by etching.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 5a–d illustrate a prior suspension design;

FIGS. 6a–d illustrate a suspension design according to one embodiment of the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a suspension design for improving the curing process for head bonding application and a method for same. Vias are provided in the load beam and the flexure so that UV light is allowed to pass to cure the UV sensitive adhesive thereby bonding the slider to the head gimbal assembly.

Figure 1:
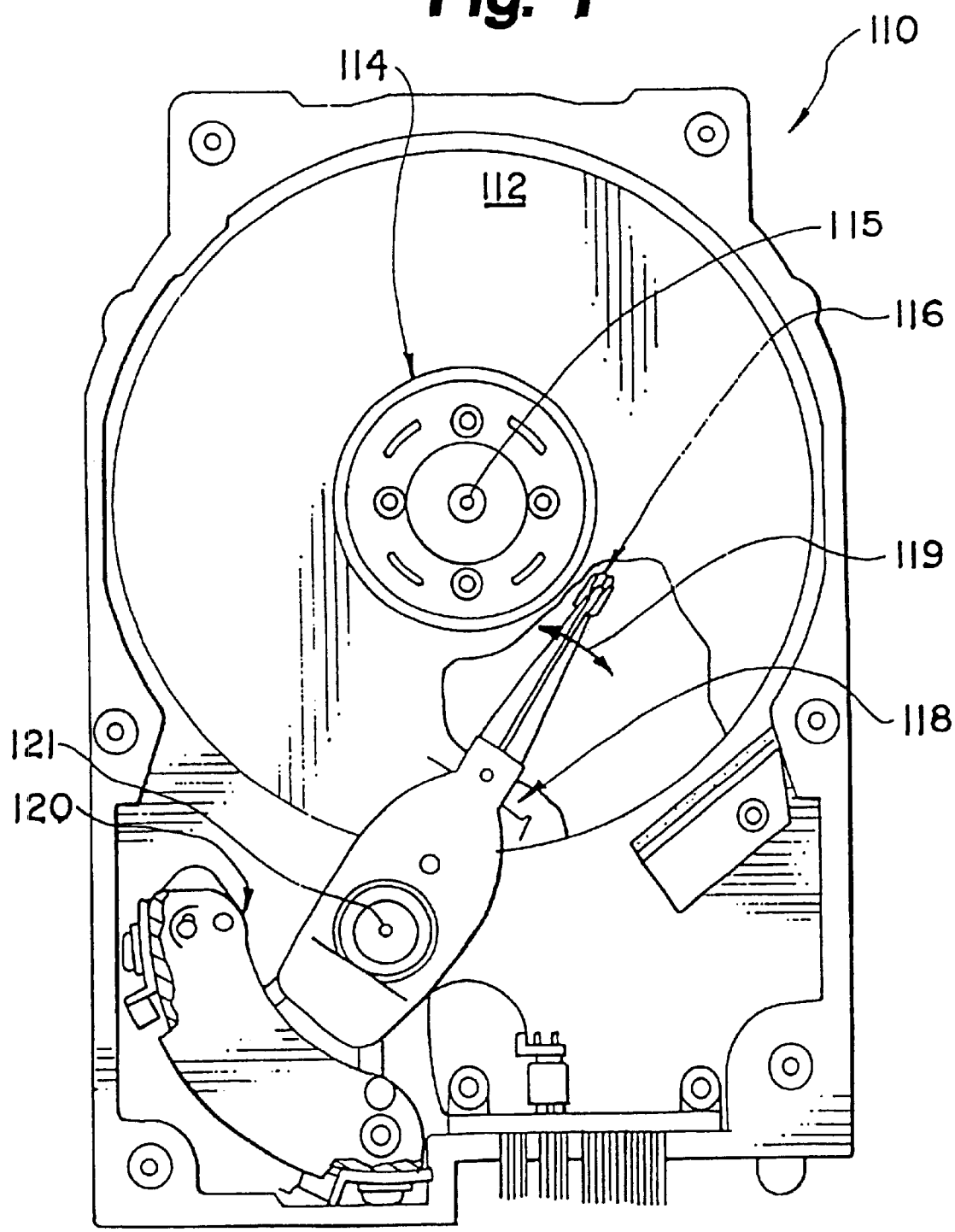
FIG. 1 illustrates a plane view of a disk drive according to the present invention.

FIG. 1 is a plan view of a disk drive 100 according to the present invention. Disk drive 100 includes a disk pack 112, which is mounted on a spindle motor (not shown) by a disk clamp 114. Disk pack 112, in one preferred embodiment, includes a plurality of individual disks which are mounted for co-rotation about a central axis 115. Each disk surface on which data is stored has an associated head gimbal assembly (HGA) 116 which is mounted to an actuator assembly 118 in disk drive 100. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disk surfaces, under the control of electronic circuitry housed within disk drive 100.

More specifically, actuator assembly 118 pivots about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal which resiliently supports a slider relative to a load beam in both pitch and roll directions so that the slider can follow the topography of the disk. The slider, in turn, includes a transducer which is utilized for encoding flux reversals on, and reading flux reversals from, the surface of the disk over which it is flying.

Figure 2:
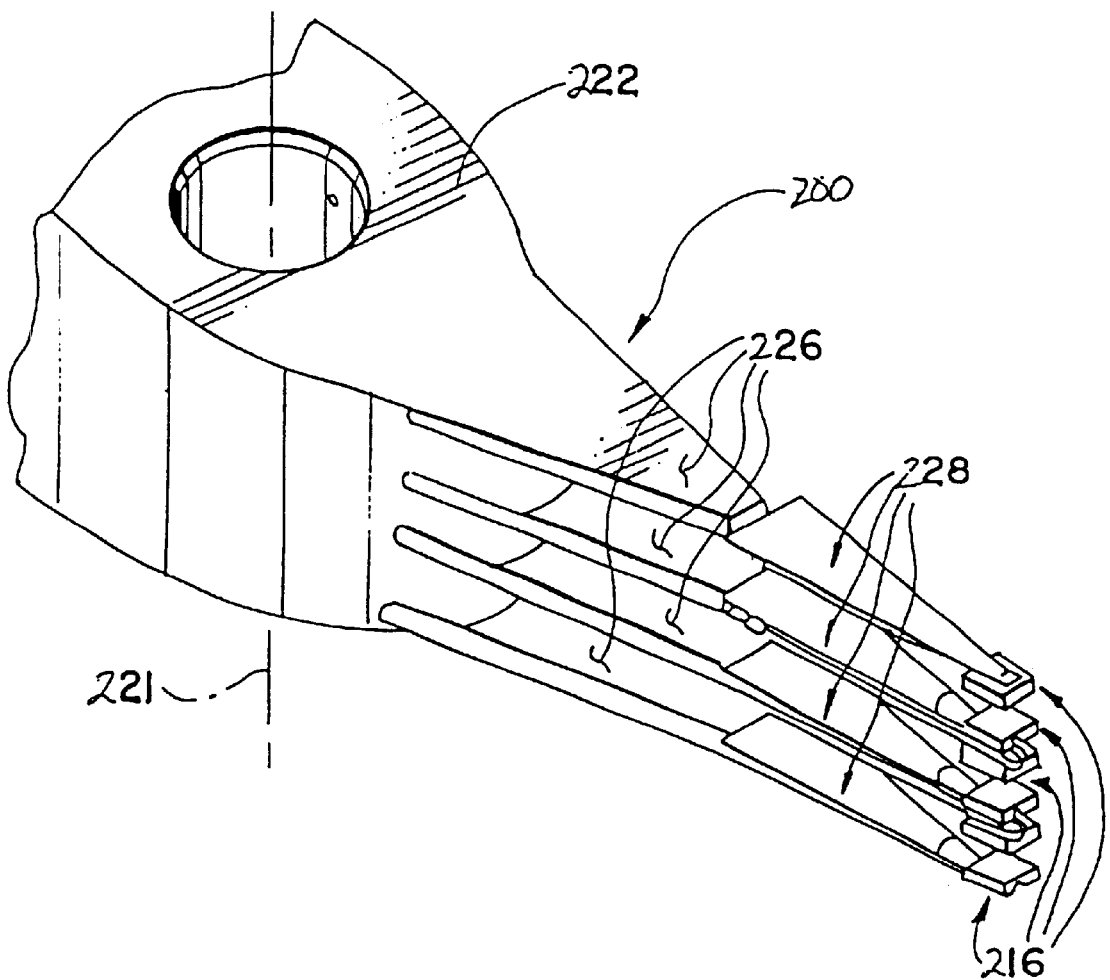
FIG. 2 is a perspective view of actuator assembly according to the present invention.

FIG. 2 is a perspective view of actuator assembly 200. Actuator assembly 200 includes base portion 222, a plurality of actuator arms 226, a plurality of load beams 228, and a plurality of head gimbal assemblies 216. Base portion 222 includes a bore which is, in the preferred embodiment, coupled for pivotal movement about axis 221. Actuator arms 226 extend from base portion 222 and are each coupled to the first end of either one or two load beams 228. Load beams 228 each have a second end which is coupled to a head gimbal assembly 216.

Figure 3:
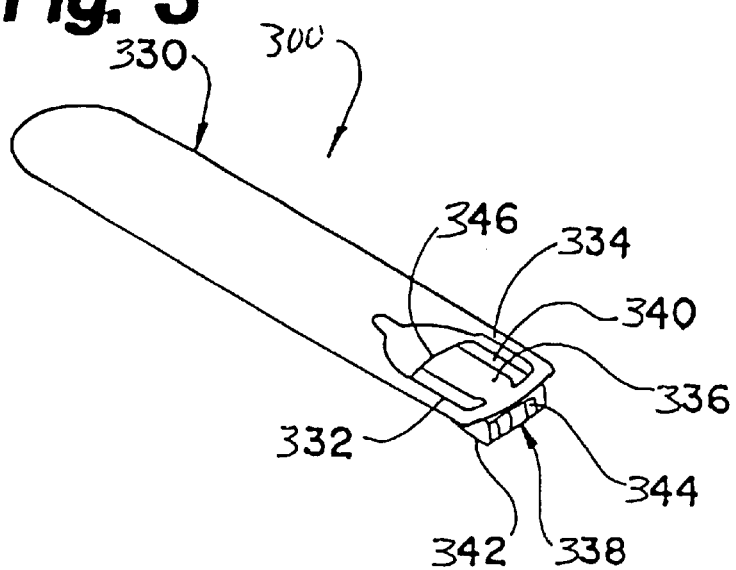
FIG. 3 illustrates an enlarged view of a head gimbal assembly according to the present invention.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338 which has an upper surface 340 and a lower, air bearing surface 342. Transducers 344 are also preferably located on a leading edge of slider 338. The particular attachment between slider 338 and gimbal 330 is accomplished using an adhesive that may be cured using ultraviolet (UV) light. Gimbal bond tongue 336 preferably terminates at a trailing edge of slider 338 with a mounting tab 346 which provides a surface at which slider 338 is attached to gimbal bond tongue 336.

Figure 4:
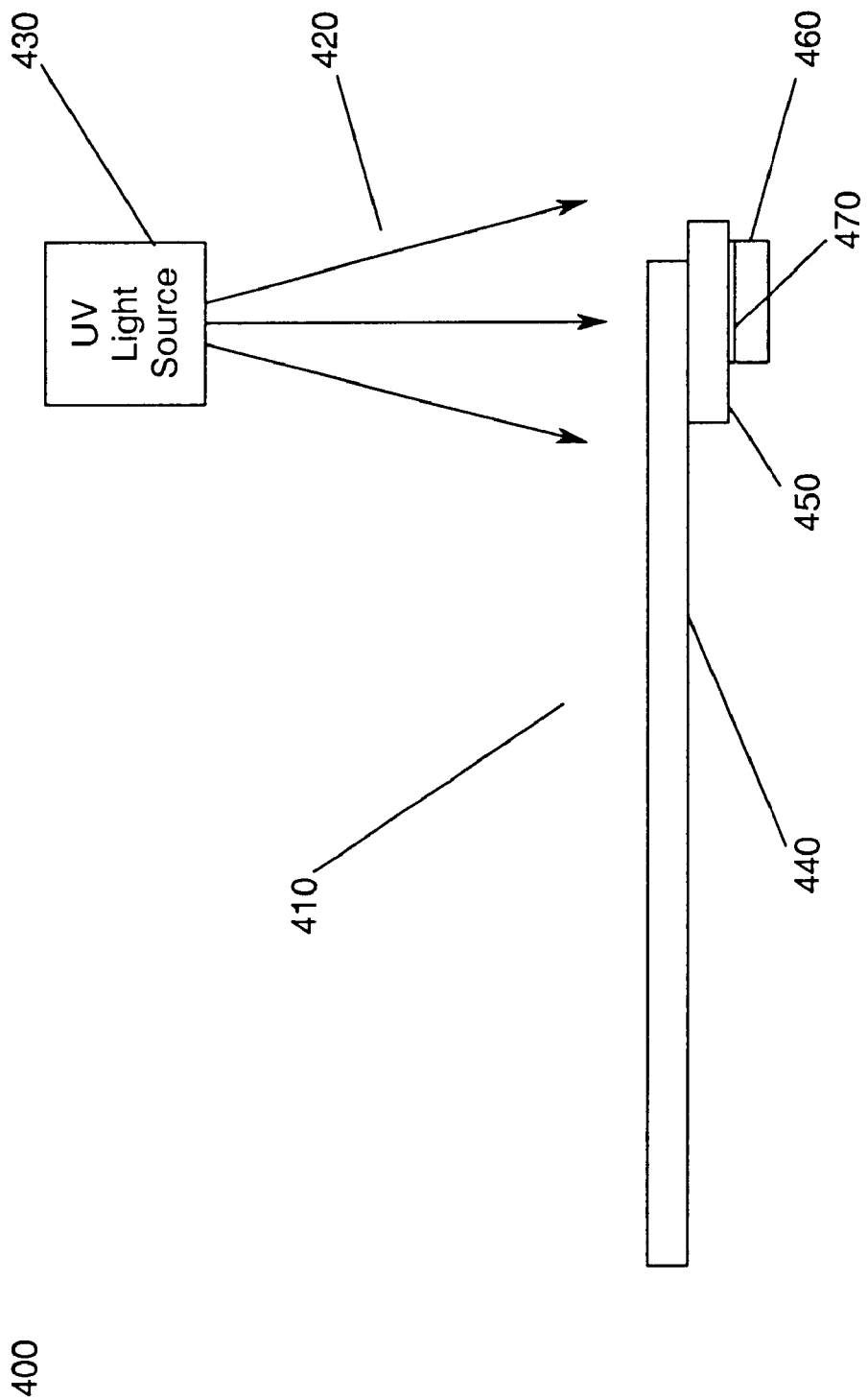
FIG. 4 illustrates a system for curing the adhesive for bonding the slider to the flexure and the load beam according to the present invention.

FIG. 4 illustrates a system 400 for curing the adhesive for bonding the slider to the flexure according to the present invention. In FIG. 4, the UV light is directed toward the assembly 410. However, unless a suspension design according to the present invention is used, which will be explained in detail with respect to FIGS. 6–7 below, the path of the UV light 420 from the UV light source 430 will be blocked by the load beam 440 and the flexure 450 and the adhesive 470 will not be fully cured. Therefore, the slider 460 will not be securely bonded to the flexure 450.

FIGS. 5a–d illustrate a prior suspension design. In FIG. 5a, a load beam 510 is shown. FIG. 5b illustrates a flexure 520 to be used with the load beam 510. FIG. 5c illustrates a slider 530 that is to be bonded to flexure 520. FIG. 5d illustrates the assembly 550 of the load beam 510, the flexure 520 and the slider 530 positioned for application of the UV curing light to bond the slider 530 to the flexure 520. However, as can be seen from FIG. 5d, the slider 530 is obscured by the load beam 510 and the flexure 520. Thus, the load beam 510 and the flexure 520 block the UV light thereby preventing the UV light from activating the chemical reaction in the adhesive so that the adhesive does not become fully cured.

FIGS. 6a–d illustrate a suspension design according to one embodiment of the present invention. In FIG. 6a, a load beam 610 is shown. The load beam 610 of FIG. 6a includes vias 660 in the form of rectangles. The rectangular vias 660 may be formed by cutting (such as by laser) or etching.

However, those skilled in the art will recognize that the present invention is not meant to be limited to the particular shape or number of vias formed in the load beam or flexure as illustrated in FIGS. 6–8. Rather, the present invention provides vias in the load beam and the flexure in a manner and position so that UV light is allowed to pass to cure the UV sensitive adhesive thereby bonding the slider to the head gimbal assembly. It is very important for the UV light to be able to access the UV adhesive along the adhesive boundary such that cured adhesive can form a seal, which prevents oxygen from getting into the adhesive. Thus, it will achieve complete cure during the following thermal cure.

FIG. 6b illustrates a flexure 620 to be used with the load beam 610. In FIG. 6b, the flexure 620 also includes vias 670. The flexure vias 670 may be formed by cutting (such as by laser) or etching, and are created so that they substantially align with the load beam vias 660. FIG. 6c again illustrates a slider 630 that is to be bonded to the flexure 620. FIG. 6d illustrates the assembly 650 of the load beam 610, the flexure 620 and the slider 630 positioned for application of the UV curing light to bond the slider 630 to the flexure 620. However, the load beam vias 660 and the flexure vias 670 allow the UV light to penetrate to the adhesive thereby effectively fully curing the adhesive so that the slider 630 is securely bonded to the flexure 620.

Figure 7D:
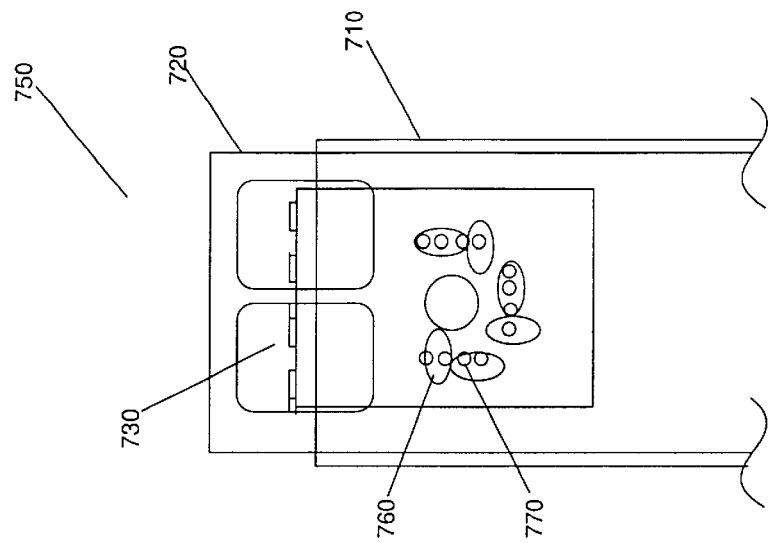
FIGS. 7a–d illustrate a suspension design according to a second embodiment of the present invention.
Figure 7C:
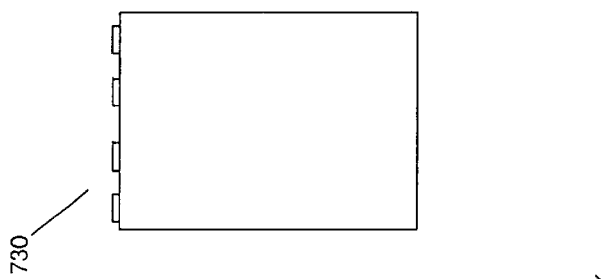
Figure 7B:
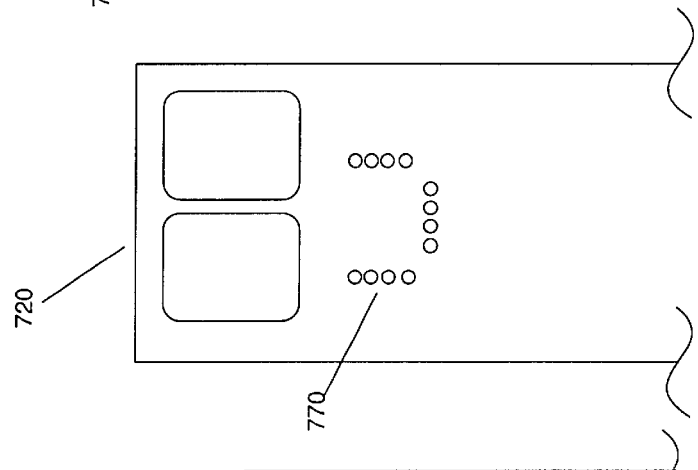
Figure 7A:
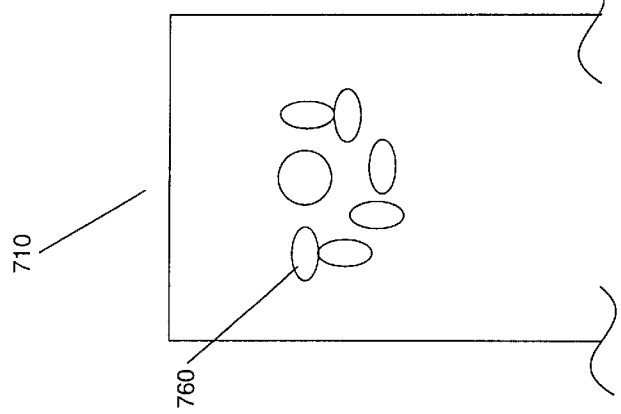

FIGS. 7a–d illustrate a suspension design according to a second embodiment of the present invention. In FIG. 7a, a load beam 710 is shown. The load beam 710 of FIG. 7a includes vias 760 in the form of circles or ovals. The circular or oval vias 760 may be formed, for example, by cutting (such as by laser) or etching. FIG. 7b illustrates a flexure 720 to be used with the load beam 710. In FIG. 7b, the flexure 720 again includes vias 770, which may be created by cutting (such as by laser) or by etching. The flexure vias 770 are created so that they substantially align with the load beam vias 760. FIG. 7c again illustrates a slider 730 that is to be bonded to the flexure 720. FIG. 7d illustrates the assembly 750 of the load beam 710, the flexure 720 and the slider 730 positioned for application of the UV curing light to bond the slider 730 to the flexure 720. However, the load beam vias 760 and the flexure vias 770 allow the UV light to penetrate to the adhesive thereby effectively fully curing the adhesive so that the slider 730 is securely bonded to the flexure 720.

Figure 8D:
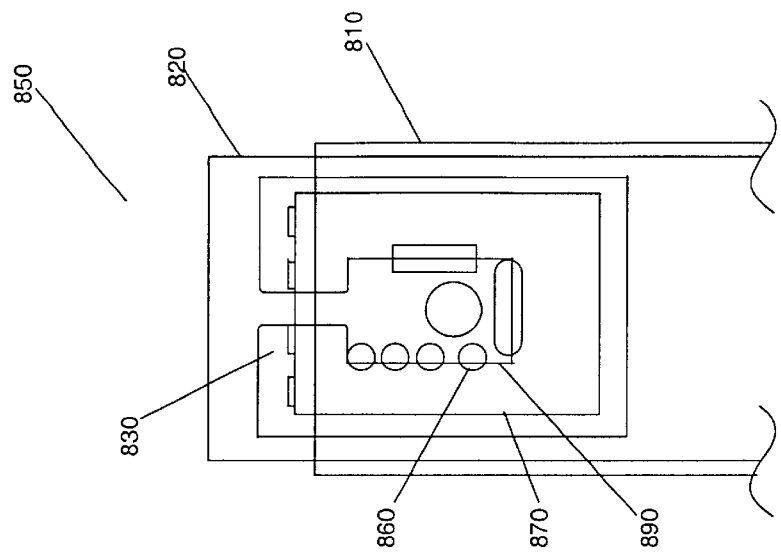
FIGS. 8a–d illustrate a suspension design according to a third embodiment of the present invention.
Figure 8C:
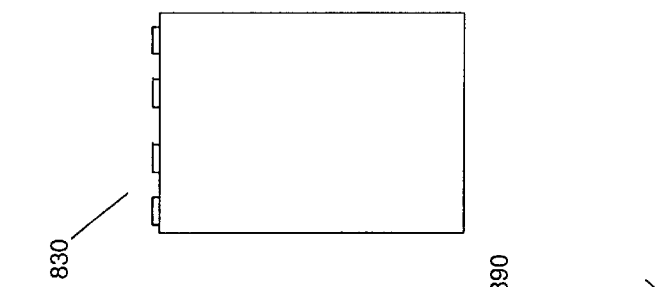
Figure 8B:
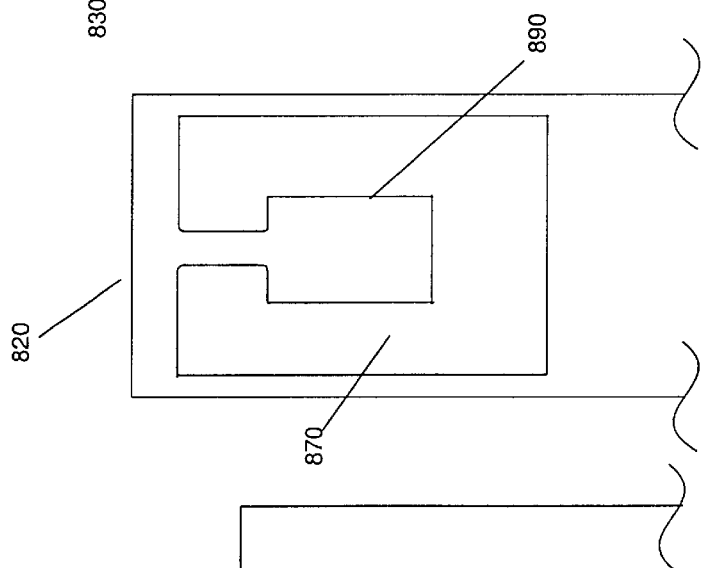
Figure 8A:
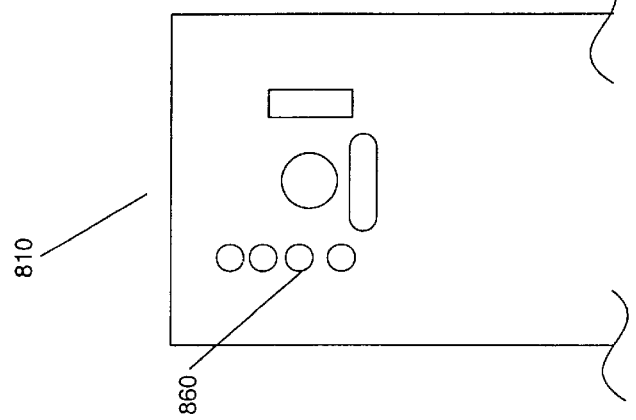

FIGS. 8a–d illustrate a suspension design according to a third embodiment of the present invention. In FIG. 8a, a load beam 810 is shown. The load beam 810 of FIG. 8a includes vias 860 in the form of circles, ovals or cutouts. The circular, oval or cutout vias 860 may be formed, for example, by cutting (such as by laser) or etching. FIG. 8b illustrates a flexure 820 to be used with the load beam 810. In FIG. 8b, the flexure 820 includes a via 870 that provides a slender tongue 890. Again, the via 870 may be created by cutting (such as by laser) or by etching. The flexure via 870 is created so that it substantially aligns with the load beam vias 860. FIG. 8c again illustrates a slider 830 that is to be bonded to the flexure 820. FIG. 8d illustrates the assembly 850 of the load beam 810, the flexure 820 and the slider 830 positioned for application of the UV curing light to bond the slider 830 to the flexure 820. However, the load beam vias 860 and the flexure vias 870 allow the UV light to penetrate to the adhesive thereby effectively fully curing the adhesive so that the slider 830 is securely bonded to the flexure 820. The flexure tongue 890 is smaller than the slider 830 such that the adhesive boundary is well defined. The load beam vias 860 are aligned with the perimeter of the flexure tongue 890.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive, comprising:
   a rotating data storage medium mounted for rotation about an axis;
   a head gimbal assembly, the head gimbal assembly comprising a load beam, a flexure and a slider, wherein the slider includes a transducer; and
   an actuator, coupled to the head gimbal assembly, for moving the transducer relative to the data storage medium for reading and writing data to the data storage medium,
   wherein the load beam has load beam vias formed therein at a distal end thereof and the flexure has at least one flexure via formed therein, the load beam vias and the at least one flexure via are positioned to allow UV light to pass through without blocking to cure a UV sensitive adhesive used to securely bond the slider to the flexure.

2. The disk drive of claim 1 wherein positions for the at least one flexure via are selected to align with the load beam vias.

3. The disk drive of claim 1 wherein the load beam vias are formed using a laser to cut the load beam vias in the load beam.

4. The disk drive of claim 1 wherein the at least one flexure via are formed using a laser to cut the flexure vias in the flexure.

5. The disk drive of claim 1 wherein the load beam vias are formed by etching the load beam vias in the load beam.

6. The disk drive of claim 1 wherein the at least one flexure via are formed by etching the flexure vias in the flexure.

7. The disk drive of claim 1 wherein the at least one flexure via forms a flexure tongue that is smaller than the slider to provide a defined adhesive boundary.

8. The disk drive of claim 7 wherein the load beam vias are aligned with a perimeter of the flexure via.

9. A head gimbal assembly for a disk drive, comprising:
   a load beam having load beam vias formed therein at a distal end thereof;
   a flexure coupled to the load beam, the flexure having at least one flexure via formed therein; and
   a slider having a transducer for reading and writing data to data storage media, the slider having a UV sensitive adhesive applied thereto;
   wherein the load beam vias and the at least one flexure via are positioned to allow UV light to pass through without blocking to cure the UV sensitive adhesive to securely bond the slider to the flexure.

10. The head gimbal assembly of claim 9 wherein positions for the at least one flexure via are selected to align with the load beam vias.

11. The head gimbal assembly of claim 9 wherein the load beam vias are formed using a laser to cut the load beam vias in the load beam.

12. The head gimbal assembly of claim 9 wherein the at least one flexure via are formed using a laser to cut the flexure vias in the flexure.

13. The head gimbal assembly of claim 9 wherein the load beam vias are formed by etching the load beam vias in the load beam.

14. The head gimbal assembly of claim 9 wherein the at least one flexure via are formed by etching the flexure vias in the flexure.

15. The head gimbal assembly of claim 9 wherein the at least one flexure via forms a flexure tongue that is smaller than the slider to provide a defined adhesive boundary.

16. The head gimbal assembly of claim 15 wherein the load beam vias are aligned with a perimeter of the flexure via.

* * * * *